United States Patent
Lee et al.

(10) Patent No.: US 9,923,724 B2
(45) Date of Patent: Mar. 20, 2018

(54) METHOD AND APPARATUS FOR INSTALLING PROFILE

(71) Applicant: Samsung Electronics Co., Ltd., Gyeonggi-do (KR)

(72) Inventors: Duckey Lee, Seoul (KR); Kyungjoo Suh, Seoul (KR); Jungje Son, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 86 days.

(21) Appl. No.: 14/894,988

(22) PCT Filed: May 29, 2014

(86) PCT No.: PCT/KR2014/004816
§ 371 (c)(1),
(2) Date: Nov. 30, 2015

(87) PCT Pub. No.: WO2014/193181
PCT Pub. Date: Dec. 4, 2014

(65) Prior Publication Data
US 2016/0127132 A1 May 5, 2016

(30) Foreign Application Priority Data
May 30, 2013 (KR) .................. 10-2013-0061688

(51) Int. Cl.
*H04L 29/06* (2006.01)
*H04L 9/32* (2006.01)
(Continued)

(52) U.S. Cl.
CPC .......... *H04L 9/3263* (2013.01); *H04L 9/0819* (2013.01); *H04L 9/0825* (2013.01); *H04L 63/0869* (2013.01); *H04W 8/205* (2013.01)

(58) Field of Classification Search
CPC . H04L 63/0869; H04L 9/0819; H04L 9/0825; H04L 9/3263; H04W 8/205
See application file for complete search history.

(56) References Cited

U.S. PATENT DOCUMENTS

| 6,807,577 B1 * | 10/2004 | Gillespie | H04L 63/0823 709/203 |
| 2003/0044012 A1 * | 3/2003 | Eden | H04N 1/44 380/243 |

(Continued)

FOREIGN PATENT DOCUMENTS

| EP | 2 461 613 A1 | 6/2012 |
| WO | WO 2011/115407 A2 | 9/2011 |

(Continued)

OTHER PUBLICATIONS mAutomotive, "Connecting Cars: The Technology Roadmap", Retrieved From http://www.gsma.com/iot/wp-content/uploads/2013/02/GSMA_mAutomotive_TechnologyRoadmap_v2.pdf, Published Feb. 2013.*

(Continued)

*Primary Examiner* — Chau Le

(57) ABSTRACT

The present invention relates to a method and apparatus for installing a profile, and more specifically, to a method for managing mobile communication subscriber information (profile), such as for remotely installing and uninstalling a profile onto a security module (Universal Integrated Circuit Card (UICC)) that is embedded inside a terminal and that is not attachable or detachable, thereby replacing UICC. Accordingly, the present invention relates to a method for a server installing a profile, wherein the method for the server installing the profile for a terminal having an embedded security module comprises the steps of: receiving from the terminal a profile installation request including an identifier of the terminal embedded security module; receiving an (Continued)

encrypted profile corresponding to the installation request; and transmitting to the terminal the encrypted profile.

20 Claims, 5 Drawing Sheets

(51) Int. Cl.
*H04L 9/08* (2006.01)
*H04W 8/20* (2009.01)

(56) References Cited

U.S. PATENT DOCUMENTS

| | | | |
|---|---|---|---|
| 2004/0088260 A1* | 5/2004 | Foster | G06Q 20/382 705/64 |
| 2007/0124471 A1* | 5/2007 | Harada | G06Q 20/206 709/225 |
| 2007/0288745 A1* | 12/2007 | Kwan | H04L 9/0822 713/155 |
| 2009/0055918 A1* | 2/2009 | Chang | G06F 21/57 726/10 |
| 2009/0227274 A1* | 9/2009 | Adler | H04L 63/0272 455/466 |
| 2009/0247124 A1* | 10/2009 | de Atley | H04W 8/205 455/410 |
| 2010/0031335 A1* | 2/2010 | Handler | H04L 9/3226 726/8 |
| 2012/0108205 A1 | 5/2012 | Schell et al. | |
| 2012/0190354 A1 | 7/2012 | Merrien et al. | |
| 2013/0012168 A1 | 1/2013 | Rajadurai et al. | |
| 2013/0262317 A1* | 10/2013 | Collinge | G06Q 20/3823 705/71 |
| 2013/0283047 A1 | 10/2013 | Merrien et al. | |
| 2014/0031012 A1* | 1/2014 | Park | H04W 12/06 455/411 |
| 2014/0140507 A1 | 5/2014 | Park et al. | |
| 2014/0329502 A1* | 11/2014 | Lee | H04W 12/06 455/411 |
| 2015/0163056 A1* | 6/2015 | Nix | H04L 9/0869 380/46 |

FOREIGN PATENT DOCUMENTS

| | | |
|---|---|---|
| WO | WO 2012/017059 A1 | 2/2012 |
| WO | WO 2013/009045 A2 | 1/2013 |
| WO | WO 2013/036011 A2 | 3/2013 |

OTHER PUBLICATIONS

CSMG, "Reprogrammable SIMs: Technology, Evolution and Implications", Retrieved From https://www.ofcom.org.uk/data/assets/pdf_file/0024/44754/reprogrammable-sims.pdf, Published Sep. 25, 2012.*

International Search Report dated Sep. 29, 2014 in connection with International Application No. PCT/KR2014/004816; 7 pages.

Written Opinion of the International Searching Authority dated Sep. 29, 2014 in connection with International Application No. PCT/KR2014/004816; 9 pages.

* cited by examiner

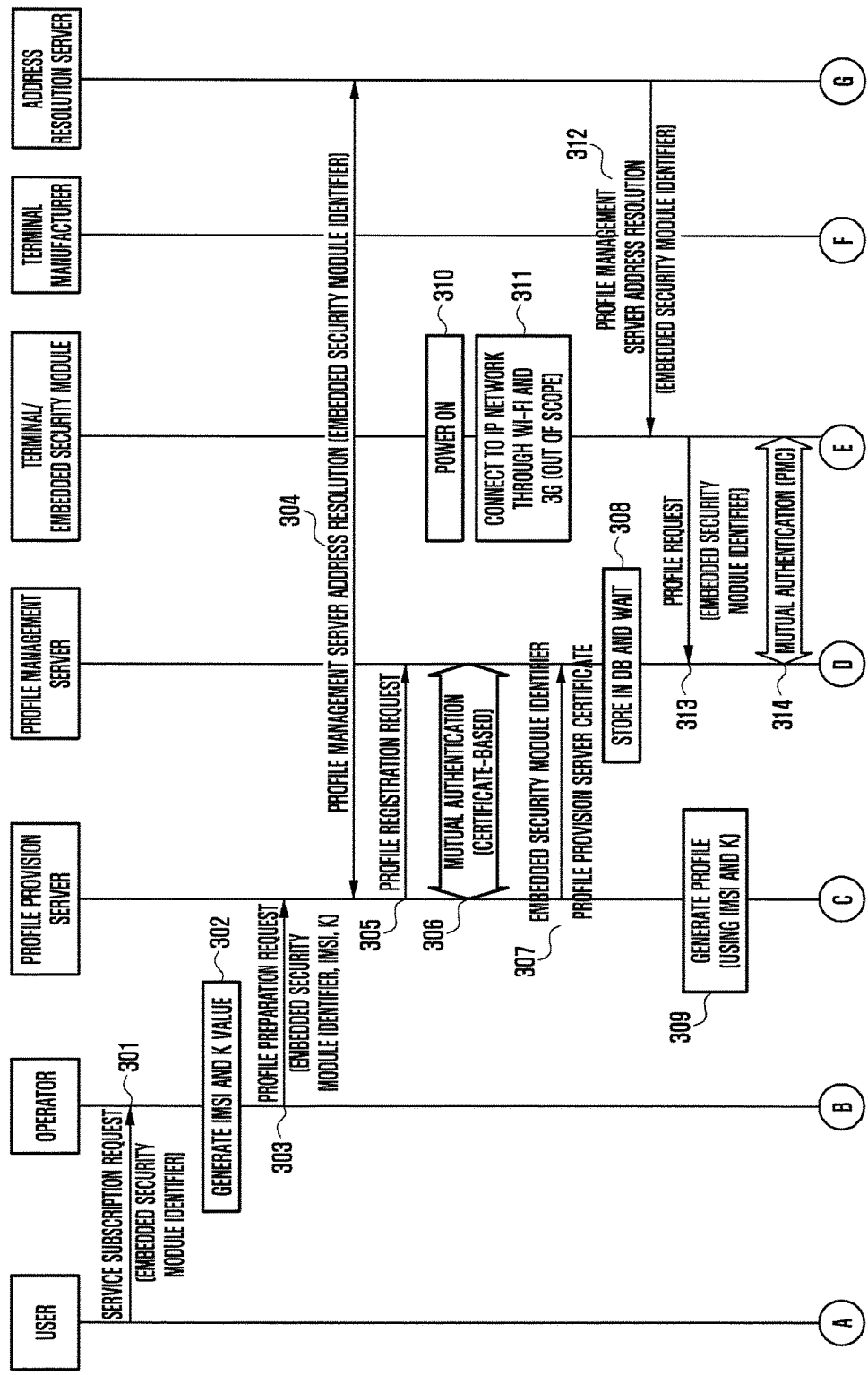

METHOD AND APPARATUS FOR INSTALLING PROFILE

CROSS-REFERENCE TO RELATED APPLICATIONS AND CLAIM OF PRIORITY

The present application claims priority under 35 U.S.C. § 365 to International Patent Application No. PCT/KR2014/004816 filed May 29, 2014, entitled "METHOD AND APPARATUS FOR INSTALLING PROFILE", and, through International Patent Application No. PCT/KR2014/004816, to Korean Patent Application No. 10-2013-0061688 filed May 30, 2013, all of which are incorporated herein by reference into the present disclosure as if fully set forth herein.

TECHNICAL FIELD

The present invention relates to a method and apparatus for installing a profile and, in particular, to a management method for installing/uninstalling mobile communication subscriber information (profile) in a non-detachable Universal Integrated Circuit Card (UICC) installed in a terminal.

BACKGROUND ART

The Universal Integrated Circuit Card (UICC) is a smartcard installed in a mobile communication terminal and it stores private information such as subscriber's network access authentication information, phonebooks, and SMS messages.

The UICC generates subscriber authentication and traffic security in connecting to a mobile communication network such as GSM, WCDMA, and LTE networks, for secure mobile communication.

The UICC is a SIM, USIM, or ISIM application depending on the type of the mobile communication network to which the subscriber connects. The UICC also provides a high level security function for installing various applications such as electronic wallet, ticketing, and electronic passport applications.

The conventional UICC is manufactured on demand as a dedicated card for a specific mobile communication operator. Accordingly, the authentication information (e.g. USIM application, IMSI, and K value) for connection to the corresponding operator network is stored in the UICC in the manufacturing stage. The mobile communication operator provides the subscriber with the manufactured UICC and, if necessary, may perform remote management to install, update, and delete application in the UICC through an Over The Air (OTA) technology. The subscriber may insert the UICC into a mobile communication terminal to use the corresponding mobile communication operator's network and application services and, if necessary, may detach the UICC from the terminal and attach to another terminal so as to use the authentication information, contacts, and phonebooks stored in the corresponding UICC with the new terminal as they were.

DISCLOSURE OF INVENTION

Technical Problem

The UICC has a physical shape and logical function defined by a standardization organization of the European Telecommunications Standards Institute (ETSI) to maintain international compatibility. In view of the form factor defining the physical shape, the UICC decreases in size gradually from the most widely used Mini SIM to a Micro SIM emerged a few years ago and to a recent Nano SIM. This contributes much to the compact design of mobile communication terminals.

However, since a UICC card smaller in size than the Nano SIM increases the loss probability and a detachable UICC card requires space for mounting a detachable slot to the terminal, it is likely to be difficult to expect reducing the size of the UICC anymore.

Also, the detachable UICC is not appropriate for Machine-to-Machine (M2M) devices which connect to the mobile communication data network without user's manipulation in various installation environments such as an intelligent electronic appliance, an electricity/water meter, and CCTV camera.

In order to solve above problems, there is a requirement for installing a security module responsible for the functions of the UICC in the manufacturing stage of the mobile communication terminal. However, since such a security module is installed inside the terminal in the terminal manufacturing stage so as not to be detached, it is impossible to install the authentication information for connection to a specific mobile communication operator's network such as IMSI and K value of the USIM in the manufacturing stage before the user who has purchased the terminal subscribes to a specific mobile communication operator and configure the authentication information.

Unlike the conventional UICC which is manufactured and distributed for specific mobile communication operators, the newly introduced embedded security module is capable of allowing for the user who has purchased the terminal to install and maintain the authentication information of various mobile communication operators securely and flexibly in such a way of subscribing and unsubscribing to a specific mobile communication operator or switching the subscription between operators.

Thus, the present invention aims to provide a method for installing UICC information of various mobile communication operators in an embedded security module (instead of the conventional detachable UICC) remotely through a network.

Solution to Problem

In accordance with an aspect of the present invention, a profile installation method of a server for a terminal having an embedded security module includes receiving a profile installation request including an identifier of the embedded security module from the terminal, receiving an encrypted profile corresponding to the installation request, and transmitting the encrypted profile to the terminal.

In accordance with another aspect of the present invention, a profile installation method of a server for a terminal including an embedded security module includes generating a profile corresponding to an identifier of the embedded security module, encrypting the profile in response to a profile installation request from the terminal, and transmitting the encrypted profile.

In accordance with another aspect of the present invention, a server for installing a profile in a terminal having an embedded security module includes a communication module for data communication with the terminal and a control unit which controls the communication unit to receive a profile installation request including an identifier of the embedded security module from the terminal, receive an encrypted profile corresponding to the installation request, and transmit the encrypted profile to the terminal.

In accordance with still another aspect of the present invention, a server for installing a profile in a terminal having an embedded security module includes a communication unit for data communication with the terminal, a storage unit for storing at least one profile, and a control unit which encrypts the profile in response to a profile installation request from the terminal and controls the communication unit to transmit the encrypted profile.

Advantageous Effects of Invention

According to a preferred embodiment of the present invention, it is possible to transfer and install a profile corresponding to the legacy UICC information of the mobile communication operator to the embedded security module of the mobile communication terminal purchased by the user. According to an embodiment of the present invention, a profile management server for managing the embedded security module of a terminal and a profile provision server for generating a UICC profile in association with a specific mobile communication operator are separated such that the terminal encodes a session key and authenticate the profile with a digital certificate provided by the profile provision server and thus can transfer the encoded profile to the embedded security module of the terminal without exposing the content of the profile to the profile management server positioned between the profile provision server and the terminal.

MODE FOR THE INVENTION

The present invention includes a mobile communication terminal, a terminal's embedded security module, a profile provision server, a profile management server, and an optional address search server. The profile installed in the terminal's embedded security module refers to data information such as at least one application, subscriber authentication information, and phonebook.

The profile provision server may be managed by a mobile communication operator or a third party in full trust with the mobile communication operator. Depending on the business and contract, the profile provision server may provide the service for one or more mobile communication operators. The profile provision server is responsible for generating and encrypting the profiles of the subscribers of the corresponding mobile communication operator and transferring the encrypted profiles to the profile management server.

The profile management server is a server for managing the profile stored in a specific terminal's embedded security module and transmitting the encrypted profile from the profile provision server to the corresponding terminal's embedded security module securely. After the profile is decrypted and installed in the security module, the profile management server manages the profile in such a way of activating, deactivating, and deleting the profile.

One or more profiles can be installed in one terminal's embedded security module, and the terminal selects one of the installed profiles for use in accessing a mobile communication network.

Definitions of Terms

Mobile communication terminal: Mobile Device
Terminal's embedded security module: embedded Secure Element (eSE). eUICC is a kind of eSE.
Profile management server: Profile Manager, Profile provision server: Profile Provider, Address search server: Address Resolution Server
Profile management authentication information: PMC (Profile Management Credentials)
Profile management user authentication information: PMUC (Profile Management User Credentials)
Profile provision authentication information: PIC (Profile Installer Credentials)

Exemplary embodiments of the present invention are described with reference to the accompanying drawings in detail.

Figure 1:
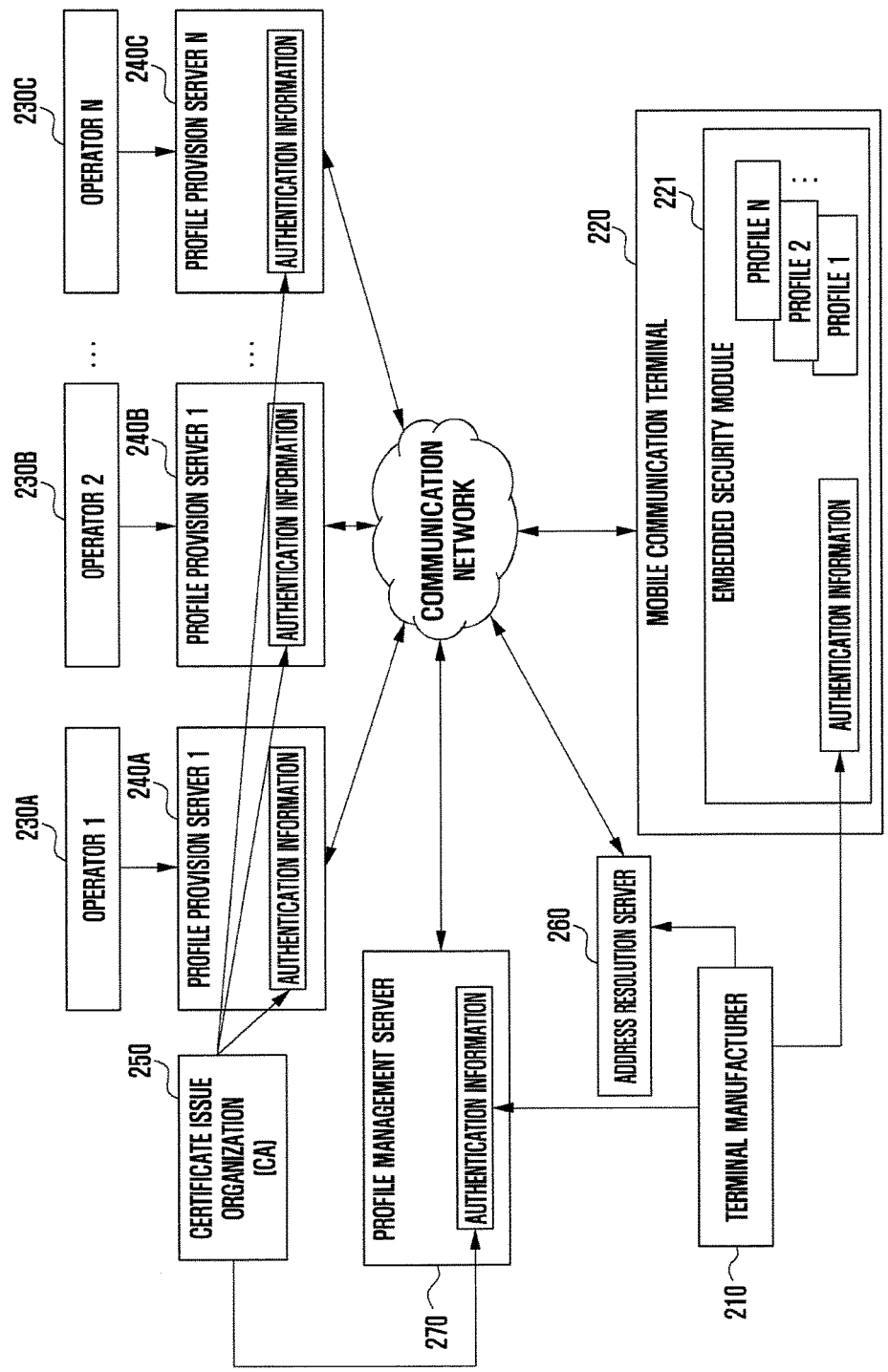
FIG. 1 is a diagram illustrating a profile installation method according to the present invention.

FIG. 1 is a diagram illustrating a profile installation method according to the present invention. In detail, FIG. 1 shows a procedure of installing UICC profile in the security module of the terminal since the subscriber has subscribed to a service of the mobile communication operator.

The user subscribes to a mobile communication service of the mobile communication operator at step 102. The mobile communication terminal's embedded security module is allocated an identifier having a globally unique value which is used for subscribing to the service. According to an embodiment of the present invention, the identifier of the terminal's embedded security module may be requested in the service subscription process. Thus, various methods may be provided in order for the user to check the identifier value easily.

For example, the identifier value stored in the memory of the terminal's embedded security module may be presented to the user through a menu selection operation on a screen of the terminal. The identifier of the terminal's embedded security module may also be printed on sticker label along with a terminal serial number in order for the user to check it without turning on the terminal.

According to an embodiment of the present invention, the identifier value of the terminal's embedded security module has to be transmitted to the mobile communication operation in subscribing to the mobile communication service. The identifier may be transmitted to the mobile communication operator in such a way that the subscriber enters the identity value on the online subscription screen of the mobile communication operator, the terminal transmits its own security module identifier value to the mobile communication operator's server through a network protocol, or an offline agent reads a label of the terminal with a barcode reader and sends the read information to the mobile communication operator's server in service subscription phase.

Also, when subscribing to the service, the user authentication information for profile management may be requested. There is therefore a need of a method for the user to check the PMUC value easily, and the same method as checking the terminal's embedded security module identifier may be provided to the user.

Also, the user authentication information for profile management may be modified by the user so as to be updated in the terminal's embedded security module.

If service subscription is requested, the user authentication information for profile management which has been transmitted by the user to the mobile communication operator along with the terminal's embedded security module identifier is compared with a value stored in the terminal's embedded security module in installing the profile for verification so as to be used stop profile installation when verification fails. In this way, a user level security mechanism is provided such that only the legal user who knows the user authentication information for profile management can request to the mobile communication operator for profile installation in the terminal's embedded security module.

If the subscription request is received, the mobile communication operator prepares for installing the profile for the subscriber in the embedded security module of the corresponding terminal using the profile provision server and the profile management server at step 103.

In detail, the profile provision server connects to the profile management server through a communication network and registers the embedded security module identifier value of the terminal with the profile management server. At this time, the profile provision server may send the profile management server a digital certificate along with the terminal's embedded security module identifier. The digital certificate is used in encrypting a session key generated by the terminal's embedded security module (step 104) and in authenticating the profile transmitted to the terminal's embedded security module (step 106).

The profile provision server has to know the address of the profile management server to connect to the profile management server which manages the embedded security module of the terminal requested for the subscription.

In an embodiment, the address or identifier value of the profile management server may be transmitted to the profile management server along with the identifier of the terminal's embedded security module.

In another embodiment, the profile provision server may acquire the address of the profile management server which is responsible for managing the profile of the embedded security module of the corresponding terminal using the terminal's embedded security module identifier. In order to check the address of the profile management server using the identifier, it may be possible for the profile provision server to manage the mapping between the terminal's embedded security module identifier and the profile management server in the form of a table or to inquire of an external server the address of the profile management server with the terminal's embedded security module identifier as a key value and receive the address from the external server. In the case of using the external server, it may be possible to register a mapping between the terminal's embedded security module identifier configured in the form of Fully Qualified Domain Name and the IP address of the profile management server with a DNS server and uses the DNS server as the external server. It is also possible to configure the identifier as a number such as phone number, store a mapping between the address of the profile management server in the form of an IP address or URL and the configured number in the ENUM server, and use the ENUM server as the external server. It is also possible to define a new network entity which is responsible for managing a mapping between the terminal's embedded security module identifier and the profile management server and use the new network entity as the external server.

When the profile provision server connects to the profile management server to register the security module identifier value, the authentication may be performed mutually or uni-directionally using an ID/password-based authentication scheme, shared secret key-based authentication scheme, or digital certificate-based authentication scheme.

If the authentication procedure is completed successfully and the terminal's embedded security module identifier is registered with the profile management server, the profile management server stores the information such as address or identifier of the profile provision server requested for the registration and the terminal's embedded security module identifier in a database for use in installing the profile.

In addition to the above information, the profile provision server may also generate the profile, in advance, which is transmitted to the profile management server so as to be stored in the database.

A profile installation request is communicated between the profile management server and mobile communication terminal at step 104. The profile management server may generate the installation request message to the mobile communication terminal, or the mobile communication terminal may generate the profile to the profile management server.

If the profile management server does not know the IP address/port number to connect to the mobile communication terminal or the phone number to transmit a WAP Push message when it transmits the installation request message to the mobile communication terminal or if it is impossible to connect to the terminal due to a certain reason such as power-off state of the mobile communication terminal, the profile management server stores the installation information in the database for use in installing the profile in response to the receipt of the installation request message from the mobile communication terminal afterward. The profile management server may attempt to transmit the installation request message periodically until it becomes possible to connect to the mobile communication terminal.

If the mobile communication terminal powers on or if an explicit user's manipulation to request for profile installation is detected, the mobile communication terminal may transmit a profile installation request message to the profile management server. At this time, if the corresponding profile installation information received from the profile provision server is stored in the database of the profile management server, the profile management server may install the profile immediately (embodiment of FIG. 4). If not, the profile management server stores the IP address, port number, and terminal's embedded security module identifier value in the internal database and waits. In this case, the profile management server may connect to the mobile communication terminal to install the profile at the time when the profile installation request to the mobile communication terminal is received using the mobile communication terminal information stored in the database. If there is no information about the corresponding profile installation in the internal database, the profile management server which has received the profile installation request message from the mobile communication terminal connects to the profile provision server and requests for the profile of the mobile communication terminal to install the profile.

In the case that the profile management server attempts to connect to the profile provision server, the profile management server has to know the connection address information of the profile provision server. For this purpose, the profile management server receives the mobile communication operator information such as MCC+MNC along with the profile installation request message from the mobile communication terminal and acquires the address of the profile provision server from the mobile communication operator information. The profile provision server address may be acquired from the mapping between the mobile communication operator information and the profile provision server address managed in the database of the profile management server. It is also possible for the profile management server to inquire of the address resolution server the profile provision server address with the mobile communication operator information.

After transmitting the installation request message, the profile management server and the mobile communication terminal may perform a mutual or uni-directional authentication. The authentication may be performed using an ID/password-based authentication scheme, shared secret key-based authentication scheme, or digital certificate-based authentication scheme.

After completing the authentication procedure, the profile management server transmits a received digital certificate to the terminal at step 103. The terminal's embedded security module which has received the certificate generates a session key for encrypting the profile at step 105 and encrypts a session key with the public key included in the digital certificate. Also, the terminal's embedded security module stores the session key and digital certificate in the internal memory for use in the operation of step 106.

If the encrypted session key is received, the profile management server sends the profile management server the encrypted session key.

The profile provision server decrypts the encrypted session key using a private key paired with the public key included in the digital certificate at step 105. The profile provision server also encrypts the profile with the decrypted session key and sends the encrypted profile to the profile management server. At this time, a profile verification value may be transmitted for use in the transmitter authentication and message integrity verification.

The profile verification value may be generated by applying a hash function such as SHA 1 of concatenating the decrypted session key and profile. Also, the profile verification value may be generated by applying the decrypted session key and the profile to a function such as HMAC-SAH-1. In another approach, the profile verification value may be generated by applying an electronic signature such as SHA1 with RSA to the profile with the private key of the digital certificate.

The profile management server transmits the encrypted profile and profile verification value to the terminal.

At step 106, the terminal's embedded security module decrypts the encrypted profile with the session key stored at step 104. The terminal's embedded security module verifies the verification value received along with the encrypted profile using the session key or the public key of the digital certificate.

If it fails to verify the verification value, the terminal's embedded security module stops the profile installation process and sends the profile management server a failure message.

Otherwise if it succeeds in verifying the verification value, the terminal's embedded security module performs verification on the digital certificate.

In order to verify the validity of the digital certificate, the terminal's embedded security module determines whether specific information included in the digital certificate matches specific information included in the profile decrypted and verified.

The specific information may be the mobile communication operator information. For example, the IMSI value of the USIM application included in the profile includes MCC, MNC, and MSIN information, and the terminal's embedded security module may check the mobile communication operator information using the MCC and MNC values. The mobile communication operator information may be contained in a file or a field of the profile, and the terminal's embedded security module may use the information for validity verification.

For use in verifying the validity of the digital certificate, the mobile communication operator information may be included in the digital certificate too. For example, the mobile communication operator information may be contained in the Distinguished Name (DN) field or another extended field of the digital certificate. Since the information included in the digital certificate is signed by an authentication organization which has issued the certificate so as not to be modified or manipulated by a third party, the terminal's embedded security module can verify whether the corresponding profile has been encrypted with a valid certificate by comparing the mobile communication operator information included in the certificate and the mobile communication operator information included in the profile. The mobile communication operator information may be used to protect against Man-in-the-middle security attack in which the valid certificate transmitted by the profile provision server is replaced with an invalid certificate by someone in the middle of the communication path.

At step 104, the profile management server may send the terminal its own certificate or a third certificate instead of the certificate of the profile provision server which is received at step 103. In this case, the profile management server encrypts the session key generated by the terminal's embedded security module using the invalid certificate changed in the middle of transmission. If the session key encrypted with the invalid public key is transmitted to the profile management server, the profile management server may decrypt the session key with a private key of the invalid certificate and thus the encrypted profile transmitted at step 105 may be decoded with the decrypted session key for interception.

However, if the digital certificate includes the mobile communication operator information, the terminal's embedded security module can verify the validity of the certificate by comparing the mobile communication operator information included in the certificate with the mobile communication operator information included in the profile and thus, if the verification fails, delete the profile and perform error handling (step 108) and prevent the profile management server from using the intercepted profile, resulting in protection against the Man-in-the-middle attack.

If it fails to verify the digital certificate, the terminal's embedded security module stops the profile installation process and sends the profile management server a failure message.

Otherwise if it succeeds in verifying the digital certificate through mobile communication operator information comparison, the terminal's embedded security module stores and installs the corresponding profile in the internal memory in order for the terminal to enter the state capable of using the mobile communication service.

Figure 2:
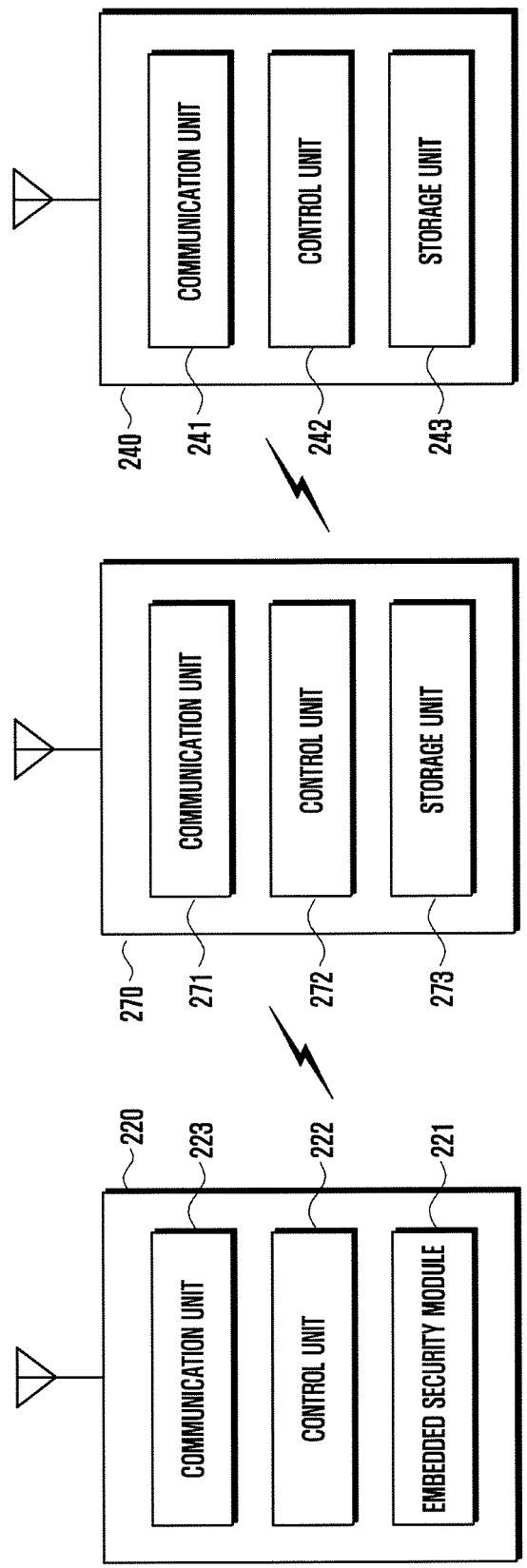
FIG. 2 is a diagram illustrating a configuration of a communication system to which the profile installation method of the present invention is applied.

FIG. 2 is a diagram illustrating a configuration of a communication system to which the profile installation method of the present invention is applied.

Referring to FIG. 2, the communication system includes a terminal manufacturer 210, a terminal 220, a mobile communication operator 230, a profile provision server 240, a certificate issue organization 250, an address resolution server 260, and a profile management server 270.

The terminal manufacturer 210 manufactures and sells the terminal 220. The terminal manufacturer 210 may manufacture the terminal 220 having an embedded security module 221. The terminal's embedded security module 221 may have a unique identifier, and the terminal manufacturer 210 may provide the identifier of the terminal's embedded security module 221 physically or in a software manner.

The terminal 220 performs data communication through a mobile communication network corresponding to the profile stored in the embedded security module 221. The terminal 220 may perform an operation for installing the profile in response to a request from the user or the manufacturer 210. In detail, the terminal 220 may send the profile management server 270 a profile request including the identifier of the terminal's embedded security module 221. At this time, the terminal 220 may perform authentication with the profile management server 270. If a digital certificate is received from the profile management server 270, the terminal 220 generates a session key and encrypts the session key with the public key of the digital certificate and sends the encrypted session key to the management server 270. Afterward, if the profile management server 270 transmits the encrypted profile, the terminal 220 decrypts the profile with the session key and installs the profile in the terminal's embedded security module 221.

The communication system of the present invention may include at least one mobile communication operator 230a, 230b, and 230c. The mobile communication operators 230a, 230b, and 230c provide the terminal 220 with communication services. The mobile communication operators 230a, 230b, and 230c may have profile provision servers 240a, 240b, and 240c and, if the user requests for service subscription, assist profile installation of the terminal 220 using the profile provision servers 240a, 240b, and 240c.

The at least one mobile communication operators 230a, 230b, and 230c may have restrictive profile provision servers 240a, 240b, and 240c. It may also be possible for a profile provision server to provide the multiple mobile communication operators with the service through a reliable contractual relationship. If a profile preparation request is received from the mobile communication operator (230a, 230b, and 230c), the profile provision server (240a, 240b, and 240c) requests to the profile management server 270 corresponding to the terminal 220 for profile registration. At this time, the address of the profile management server corresponding to the terminal 220 may be acquired from the address resolution server 260. The profile provision server (240a, 240b, and 240c) may perform mutual authentication with the profile management server 270 and send the embedded security module identifier of the terminal 220 and the digital certificate to the profile management server 270. Afterward, the profile provision server (240a, 240b, and 240c) may generate and manage the profile and, if an encrypted session key of the terminal 220 is received, decrypts the encrypted session key with the private key paired with the public key of the digital certificate. The profile provision server (240a, 240b, and 240c) also may encrypt the profile with the acquired session key and send the profile management server 270 the encrypted profile such that the terminal 220 acquires the profile.

The certificate issue organization 250 may issue a digital certificate for use in installing the profile of the terminal 220. The certificate issue organization 250 may provide the profile provision server (240a, 240b, and 240c) with the authorized digital certificate.

The address resolution server 260 may map the identifier of the terminal's embedded security module identifier configured in the form of a Fully Qualified Domain Name (FQDN) with the IP address of the profile management server and register the mapping. The address resolution server 260 also may configure the identifier as a number (such as phone number) and the address of the profile management server in the form of an IP address or URL and store a mapping between them in the ENUM server. At this time, the address resolution serer 260 may be a DNS server or ENUM server.

If a profile registration request is received from the profile provision server (240a, 240b, and 240c), the profile management server 270 may store the terminal's embedded security module identifier and the digital certificate contained in the registration request. If the profile installation request is received from the terminal 220, the profile management server 270 performs mutual authentication with the terminal 220 and sends the digital certificate to the terminal 220. The profile management server 270 sends the encrypted session key received from the terminal 220 to the profile provision server (240a, 240b, and 240c) and the encrypted profile received from the profile provision server (240a, 240b, and 240c) to the terminal 220.

The components depicted in FIG. 2 are not mandatory components, and the communication system may be implemented with more or less than depicted in FIG. 2.

Figure 3:
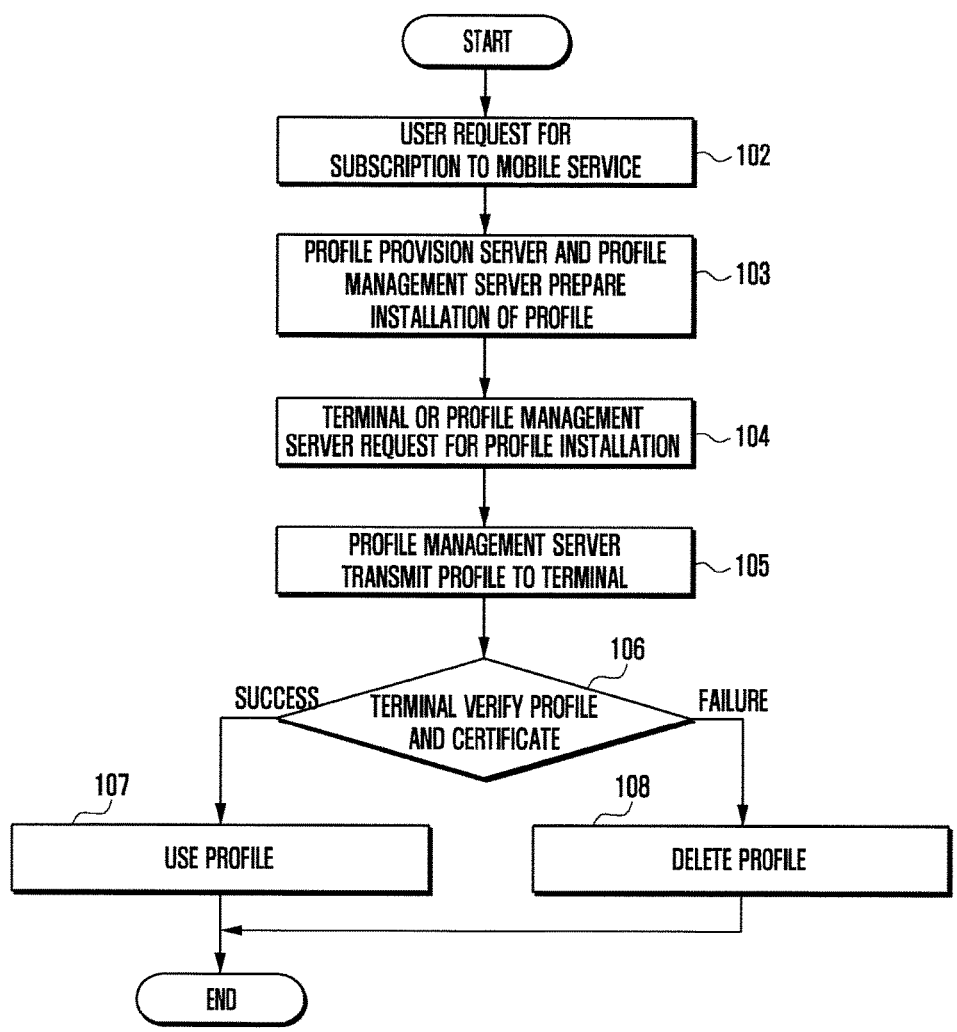
FIG. 3 is a flowchart illustrating a configuration of main devices of the communication system to which the profile installation method according to the present invention is applied.

FIG. 3 is a flowchart illustrating a configuration of main devices of the communication system to which the profile installation method according to the present invention is applied. In detail, FIG. 3 shows configurations of the terminal 220, the profile management server 270, and the profile provision server 240.

The terminal 220 may include an embedded security module 221, a control unit 222, and a communication unit 233.

The embedded security module 221 may store the authentication information necessary for profile installation and management and at least one profile installed therein. The authentication information may include the information for authentication with the profile management server 270. The authentication information also may include the information for authentication with the profile provision server 270. The authentication information may also include the information for user authentication.

The terminal's embedded security module 221 may carry out the profile installation operation according to the present invention and, for this purpose, may include a separate control unit.

The control unit 222 performs an operation for installing the profile in the embedded security module 221. The control unit 222 may be implemented so as to be integrated with or separated from the terminal's embedded security module 221.

In detail, the control unit 222 controls the communication unit 223 to transmit a profile installation request including the identifier of the embedded security module 221 and encrypted session key to the server. The control unit 222 may also encrypt the session key with the public key of the digital certificate or decrypt the encrypted profile.

The communication unit 223 is responsible for data communication with the server.

The profile management server 270 may include a communication unit 271, a control unit 272, and a storage unit 273.

The communication unit 271 is responsible for data communication with the terminal 220 or the profile provision server 240.

If the profile installation request including the identifier of the terminal' embedded security module 221 is received form the terminal 220, the control unit 272 sends the terminal 220 the encrypted profile received from the profile provision server to the terminal 220. The control unit 272 may also transmit a digital certificate to the terminal 220 and forward the encrypted session key received from the terminal 220 to the profile provision server 240. The control unit 272 may also perform mutual authentication with the terminal 220.

The storage unit 273 may store the identifier of the terminal's embedded security module 221, profile, and digital certificate temporarily or persistently.

The profile provision server 240 may include a communication unit 241, a control unit 242, and a storage unit 243.

The communication unit 241 is responsible for data communication with the terminal 220 or the profile management server 270.

The control unit 242 encrypts the profile in response to a profile installation request from the terminal 220 and transmits the encrypted profile to the profile management server 270. If the encrypted session key of the terminal 220 is transmitted, the control unit 242 decrypts the session key and encrypts the profile with the session key. At this time, the control unit 242 may send the profile management server 270 a profile verification value along with the encrypted profile.

The storage unit 243 may store at least one profile and digital certificate.

Figure 4B:
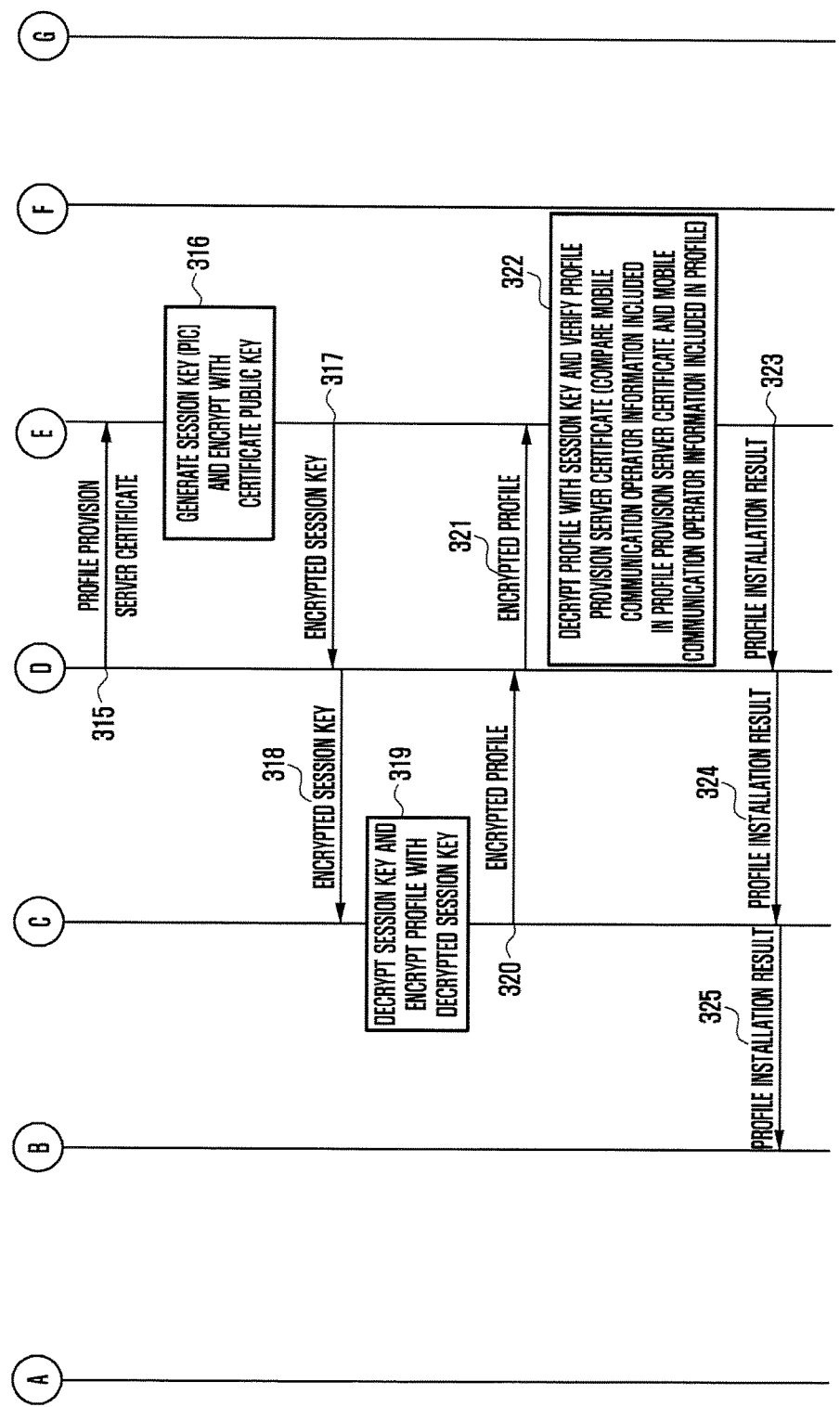
FIG. 4 is a message flow diagram illustrating the profile installation method according to the present invention in detail.

FIG. 4 is a message flow diagram illustrating the profile installation method according to the present invention in detail.

In the embodiment of FIG. 4, the profile provision server has a digital certificate issued with the mobile communication operator information, and the profile management server has the digital certificated issued too. The terminal manufacturer may manufacture and sell the terminal equipped with the embedded security module. At this time, the terminal manufacturer may manufacture the terminal including a profile management certificate (PMC) (e.g. 128-bit authentication key) and an embedded security module identifier. The terminal manufacturer may send the profile management server the terminal's embedded security module identifier and the PMC authentication information and provide the address resolution server with the mapping between the terminal's embedded security module identifier and the profile management server.

The user who has purchased the terminal subscribes to a service of the mobile communication operator at step 301. The terminal's embedded security module may be allocated an identifier having a globally unique value for user in subscribing to the service. According to an embodiment of the present invention, the identifier of the terminal's embedded security module may be requested in the service subscription process. Thus, various methods may be provided in order for the user to check the identifier value easily.

For example, the identifier value stored in the memory of the terminal's embedded security module may be presented to the user through a menu selection operation on the screen of the terminal. The identifier of the terminal's embedded security module may also be printed on sticker label along with a terminal serial number in order for the user to check it without turning on the terminal.

According to an embodiment of the present invention, the identifier value of the terminal's embedded security module has to be transmitted to the mobile communication operation in subscribing to the mobile communication service. The identifier may be transmitted to the mobile communication operator in such a way that the subscriber enters the identity value on the online subscription screen of the mobile communication operator, the terminal transmits its own security module identifier value to the mobile communication operator's server through a network protocol, or an offline agent reads a label of the terminal with a barcode reader and sends the read information to the mobile communication operator's server in service subscription phase.

If a subscription request is received, the mobile communication operator prepares for profile installation with the profile provision server and the profile management server to facilitate installing the profile for the user in the embedded security module of the corresponding terminal. At this time, the mobile communication operator may generate ISMI and secret key K as the information for configuring the profile to be installed in the embedded security module of the corresponding terminal at step 302. The mobile communication operator sends the profile provision server the terminal's embedded security module identifier and profile information at step 303.

Afterward, the profile provision server accesses the profile management server through a communication network to register the embedded security module identifier value of the corresponding terminal to which the profile is installed with the profile management server.

For this purpose, the profile provision server acquires the address of the profile management server for use in connecting to the profile management server which manages the embedded security module of the terminal which has transmitted subscription request at step 304.

In an embodiment, the subscriber may send the profile provision server the profile management server address or identifier value along with the terminal's embedded security module identifier.

In another embodiment, the profile provision server may acquire the profile management server address which manages the profile for the embedded security module of the corresponding terminal using the terminal's embedded security module identifier. In order to check the address of the profile management server using the identifier, it may be possible for the profile provision server to manage the mapping between the terminal's embedded security module identifier and the profile management server in the form of a table or to inquire of an external server the address of the profile management server with the terminal's embedded security module identifier as a key value and receive the address from the external server. In the case of using the external server, it may be possible to register a mapping between the terminal's embedded security module identifier configured in the form of Fully Qualified Domain Name and the IP address of the profile management server with a DNS server and use the DNS server as the external server. It is also possible to configure the identifier as a number such as phone number, store a mapping between the address of the profile management server in the form of an IP address or URL and the configured number in the ENUM server, and use the ENUM server as the external server. It is also possible to define a new network entity which is responsible for managing a mapping between the terminal's embedded security module identifier and the profile management server and use the new network entity as the external server.

After acquiring the address, the profile provision server requests to the profile management server for profile registration at step 305. At this time, the profile provision server may perform a mutual or uni-directional authentication with the profile management server at step 306. The authentication may be performed in an ID/password-based authentication scheme, shared secret key-based authentication scheme, or digital certificate-based authentication scheme.

If the authentication procedure is completed successfully, the profile provision server sends the profile management server the terminal's embedded security module identifier at step 307. At this time, the profile provision server may transmit a digital certificate to the profile management server too. The digital certificate may be used afterward for encrypting the session key generated by the terminal's embedded security module and verifying the profile to be transmitted to the terminal's embedded security module.

If the terminal's embedded security module identifier is registered with the profile management server completely, the profile management server stores the address or identifier of the profile provision server which has request for the registration and the information including the terminal's embedded security module identifier in the data base for use in the profile installation operation afterward at step 308. The profile provision server may also send the profile management server the profile generated in advance in addition to the above information for management in the database.

At this time, the profile provision server may also generate and store the profile for management at step 309.

Afterward, if the user powers on the terminal which is registered for the service at step 310 and if the terminal connects to a wireless network at step 311, it may resolve the address of its profile management server at step 312. At this time, the terminal may acquire the information on the profile management server through the address resolution server using the terminal's embedded security module identifier. In the case that the profile management server address is stored in the terminal's embedded security module, the terminal may acquire the information on the profile management server by referencing this information.

If the profile management server address is acquired, the terminal requests to the profile management server about the profile at step 313. At this time, the profile request may include the identifier of the terminal's embedded security module.

After the installation request message is transmitted, the profile management server and mobile communication terminal may perform mutual or uni-directional authentication at step 314. This process may be performed using a user ID/Password-based authentication scheme, shared secret key-based authentication scheme, or digital certificate-based authentication scheme.

If the transmission request is received, the profile management server sends the terminal the digital certificate received from the profile provision server at step 315. If the certificate is received, the terminal generates a session key for encrypting the profile and encrypts the session key with a public key included in the digital certificate at step 316. The terminal's embedded security module sends the profile management server the encrypted session key at step 317. In addition, the terminal's embedded security module stores the session key and digital certificate in the internal memory.

If the encrypted session key is received, the profile management server forwards the encrypted session key to the profile provision server at step 318.

The profile provision server which has received the encrypted session key decrypts the encrypted session key with a private key paired with the public key included in the digital certificate and encrypts the profile with the decrypted session key at step 319. The profile provision server also sends the profile management server the encrypted profile at step 320. At this time, a profile verification value for transmitter authentication associated with the profile and message integrity verification may be transmitted along with the encrypted profile.

The profile verification value may be generated by applying the decrypted session key and the profile to a hash function such as SHA1. Also, the profile verification value may be generated by applying an electronic signature such as SHA1 with RSA to the profile with the private key of the digital certificate. It is also possible to use a type of hash function or electronic signature function different from the exemplified one.

The profile management server sends the terminal the encrypted profile and profile verification value at step 321.

The terminal decrypts the encrypted profile with a previously stored session key. The terminal's embedded security module verifies the verification value received along with the encrypted profile using the session key or the public key of the digital certificate at step 322.

If it fails to verify the verification value, the terminal's embedded security module stops the profile installation process and sends the profile management server a failure message.

Otherwise if it succeeds in verifying the verification value, the terminal's embedded security module verifies the digital certificate.

In order to verify the validity of the digital certificate, the terminal's embedded security module determines whether specific information included in the digital certificate matches specific information included in the profile which is decrypted and verified successfully.

The specific information may be the mobile communication operator information. For example, the IMSI value of the USIM application included in the profile includes MCC, MNC, and MSIN information, and the terminal's embedded security module may check the mobile communication operator information using the MCC and MNC values. The mobile communication operator information may be contained in a file or a field of the profile, and the terminal's embedded security module may use the information for validity verification.

For use in verifying the validity of the digital certificate, the mobile communication operator information may be included in the digital certificate too. For example, the mobile communication operator information may be contained in the Distinguished Name (DN) field or another extended field of the digital certificate. Since the information included in the digital certificate is signed by an authentication organization which has issued the certificate so as not to be modified or manipulated by a third party, the terminal's embedded security module can verify whether the corresponding profile has been encrypted with a valid certificate by comparing the mobile communication operator information included in the certificate and the mobile communication operator information included in the profile.

If it fails to verify the digital certificate, the terminal stops the profile installation process and sends the profile management server a failure message at step 323.

Otherwise it succeeds in verifying the digital certificate through mobile communication operator information comparison, the terminal may store and install the corresponding profile in the internal memory to enter the state capable of using the mobile communication service.

The invention claimed is:

1. A profile installation method of a server for a terminal having an embedded security module, the method comprising:
receiving, from a profile provision server, a first message to request a profile registration, the first message including a digital certificate;
receiving, from the terminal, a second message to request a profile, the second message including an identifier of the embedded security module;
transmitting, to the terminal, the digital certificate;
receiving, from the terminal, a session key encrypted based on the digital certificate;
transmitting, to the profile provision server, the encrypted session key;
receiving, from the profile provision server, an encrypted profile corresponding to the second message, the encrypted profile generated based on the encrypted session key; and
transmitting, to the terminal, the encrypted profile.

2. The method of claim 1, further comprising performing mutual authentication, after receiving the second message, with the terminal using at least one of ID/password, secret key, or the digital certificate.

3. The method of claim 1, further comprising:
wherein the first message includes the identifier of the embedded security module; and
storing information including at least one of identity information of the profile provision server, the identifier of the embedded security module, or the digital certificate.

4. The method of claim 1,
wherein the encrypted session key is decrypted with a private key paired with a public key included in the digital certificate; and
wherein the profile is encrypted with the decrypted session key.

5. A profile installation method of a profile provision server for a terminal including an embedded security module, the method comprising:
transmitting, to a profile management server, a first message to request a profile registration, the first message including a digital certificate;
generating a profile corresponding to an identifier of the embedded security module;
receiving, from the profile management server, a session key of the terminal that is encrypted based on the digital certificate;
encrypting the profile based on the encrypted session key in response to a second message to request a profile; and
transmitting the encrypted profile.

6. The method of claim 5, wherein encrypting the profile comprises:
decrypting the encrypted session key to acquire the session key; and
encrypting the profile with the session key.

7. The method of claim 5, wherein transmitting the encrypted profile comprises transmitting a verification value for the profile along with the encrypted profile.

8. The method of claim 5, further comprising:
receiving an identifier of the embedded security module from the terminal; and
transmitting the first message further including an identifier of the embedded security module.

9. The method of claim 8, wherein transmitting the first message comprises:
transmitting the identifier of the embedded security module to an address resolution server; and
receiving an address of the profile provision server that is mapped to the identifier of the embedded security module from the address resolution server.

10. The method of claim 5, further comprising:
decrypting the encrypted session key with a private key paired with a public key included in the digital certificate; and
encrypting the profile with the decrypted session key.

11. A profile management server for installing a profile in a terminal having an embedded security module, the profile management server comprising:
a communication module for data communication with the terminal; and
a controller configured to control the communication module to:
receive, from a profile provision server, a first message to request a profile registration, the first message including a digital certificate;
receive, from the terminal, a second message to request a profile, the second message including an identifier of the embedded security module;
transmit, to the terminal, the digital certificate;
receive, from the terminal, a session key encrypted based on the digital certificate;
transmit, to the profile provision server, the encrypted session key;
receive, from the profile provision server, an encrypted profile corresponding to the second message, the encrypted profile generated based on the encrypted session key; and
transmit the encrypted profile to the terminal.

12. The profile management server of claim 11, wherein the controller is configured to perform mutual authentication with the terminal using at least one of an ID/password, a secret key, or the digital certificate.

13. The profile management server of claim 11, further comprising a storage configured to store at least one profile,
wherein the controller is configured to control storing, when the first message including the identifier of the embedded security module is received from the profile provision server through the communication module, information including at least one of identity information of the profile provision server, the identifier of the embedded security module, or the digital certificate.

14. The profile management server of claim 11,
wherein the encrypted session key is decrypted with a private key paired with a public key included in the digital certificate; and
wherein the profile is encrypted with the decrypted session key.

15. A profile provision server for installing a profile in a terminal having an embedded security module, the profile provision server comprising:
a communication module for data communication with the terminal;
a storage configured to store at least one profile; and a controller configured to:

control the communication module to transmit, to a profile management server, a first message to request a profile registration, the first message including a digital certificate;

generate a profile corresponding to an identifier of the embedded security module;

control the communication module to receive, from the profile management server, a session key of the terminal that is encrypted based on the digital certificate;

encrypt the profile based on the encrypted session key in response to a second message to request a profile; and control the communication module to transmit the encrypted profile.

16. The profile provision server of claim 15, wherein the controller is configured to:

decrypt, when a session key of the terminal that is encrypted with the digital certificate is received through the communication module, the encrypted session key to acquire the session key, and encrypt the profile with the session key.

17. The profile provision server of claim 15, wherein the controller is configured to control the communication module to transmit a verification value for the profile along with the encrypted profile.

18. The profile provision server of claim 15, wherein the controller is configured to control the communication module to:

receive an identifier of the embedded security module from the terminal, and transmit the first message further including an identifier of the embedded security module.

19. The profile provision server of claim 18, wherein the controller is configured to control the communication module to:

transmit the identifier of the embedded security module to an address resolution server, and receive an address of the profile provision server that is mapped to the identifier of the embedded security module.

20. The profile provision server of claim 15, wherein the controller is configured to:

decrypt the encrypted session key with a private key paired with a public key included in the digital certificate; and encrypt the profile with the decrypted session key.

* * * * *